Sept. 11, 1962 K. M. PENNINGTON 3,053,415
CREDIT CARD SYSTEM CONTROLLED BY DIALS OF GASOLINE PUMP
Filed Aug. 19, 1959 3 Sheets-Sheet 1
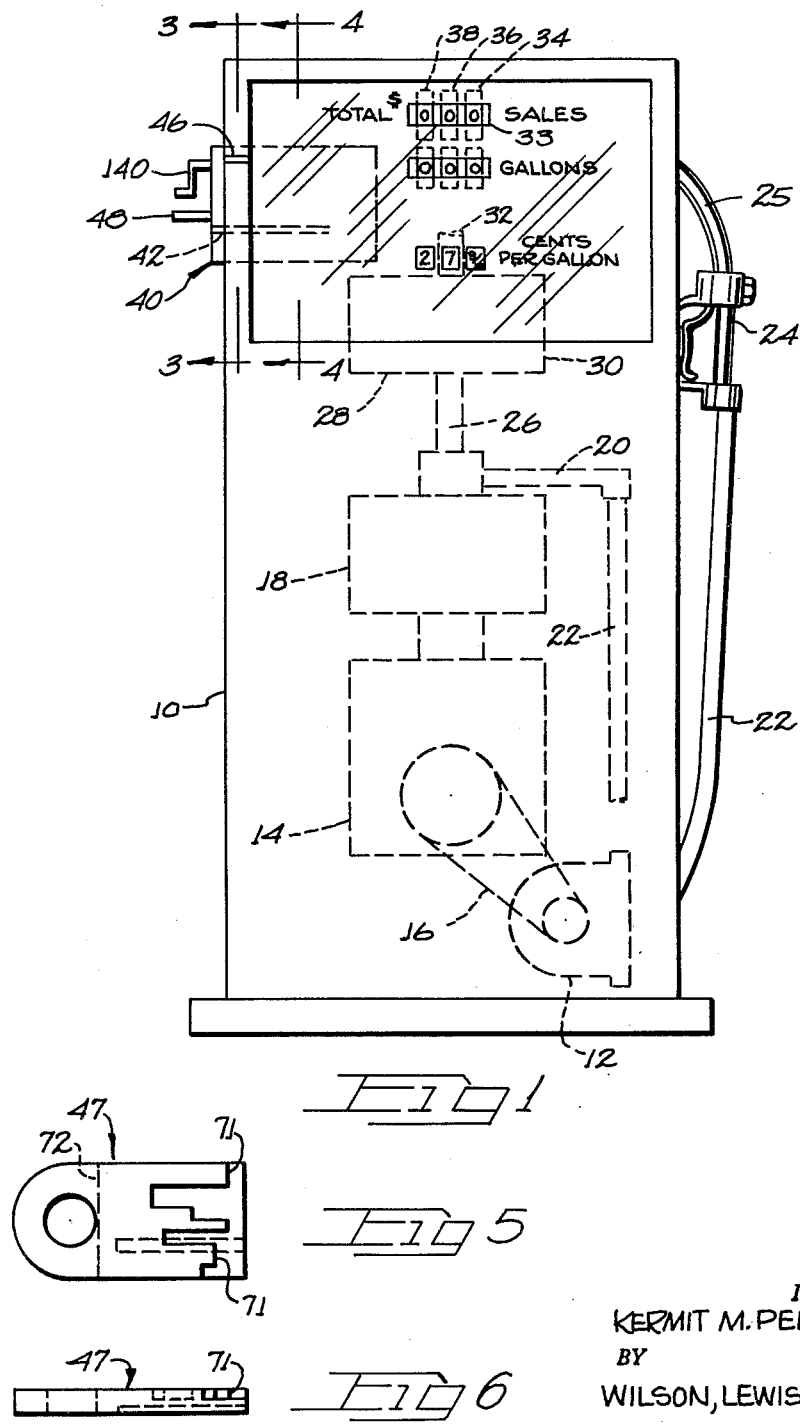
INVENTOR.
KERMIT M. PENNINGTON
BY
WILSON, LEWIS & McRAE

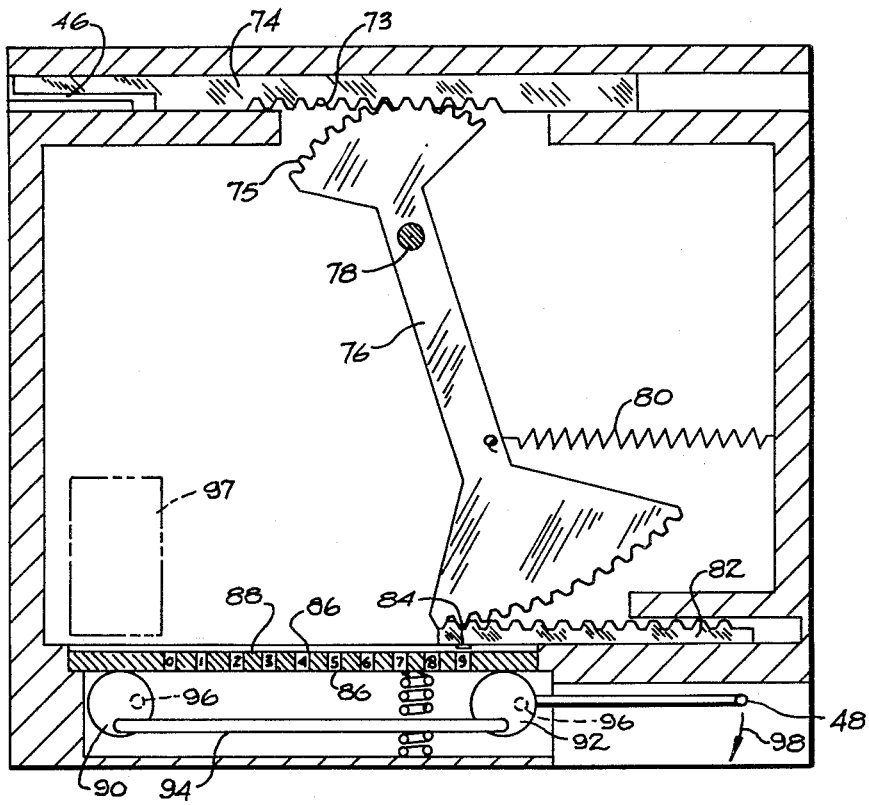

Sept. 11, 1962   K. M. PENNINGTON   3,053,415
CREDIT CARD SYSTEM CONTROLLED BY DIALS OF GASOLINE PUMP
Filed Aug. 19, 1959   3 Sheets-Sheet 3
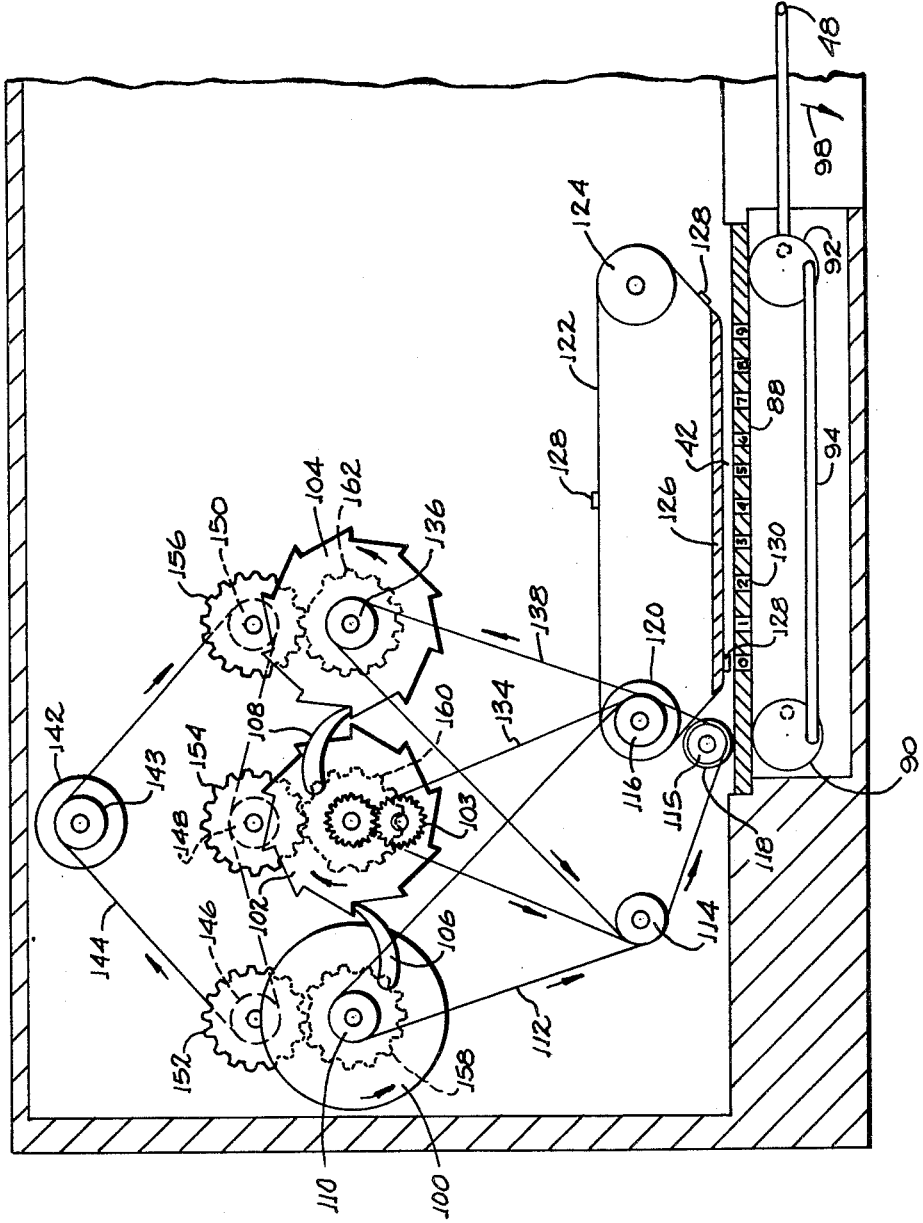
INVENTOR.
KERMIT M. PENNINGTON
BY
WILSON, LEWIS & McRAE

United States Patent Office 3,053,415
Patented Sept. 11, 1962

3,053,415
CREDIT CARD SYSTEM CONTROLLED BY DIALS OF GASOLINE PUMP
Kermit M. Pennington, 5811 Luce Road, Alma, Mich.
Filed Aug. 19, 1959, Ser. No. 834,864
13 Claims. (Cl. 222—30)

This invention relates to a recording system for use in credit purchases, particularly such systems as are employed in the credit sales of gasoline.

In the credit sales of gasoline (or any commodity or service) two items of information must be recorded on the credit ticket for billing purposes, i.e. the customers identity, and the dollar value of the purchase. Other bits of information such as the date of sale, invoice number, and description of merchandise can also be recorded if desired. Generally the recording of these items has been performed manually, with consequent possibilities of error and excessive time expenditures.

However one proposed method of handling gasoline credit sales has to a certain extent alleviated these problems. In this proposed method the gasoline station attendant is provided with a machine into which he places a credit ticket or record sheet. The machine is provided with a slot for reception of a specially configured customer identity key (different for each customer) as well as a set of manually-operated control elements which can be set by the attendant in accordance with the dollar amount of the customer's purchase.

In use of the machine the customer gives his key to the attendant and the attendant inserts the key into the machine, which has the effect of setting special marking elements into "customer identifying" positions adjacent the credit ticket. The attendant then sets the manual control elements in accordance with the value of the customer's dollar purchase.

The last step in recording the credit purchase is the step of actuating the marking elements to make a record on the credit ticket. The attendant performs this step manually by actuation of a lever connected with the marking elements. The arrangement is such that actuation of the lever brings the marking elements and ticket together so as to make a permanent record of the customer's identity and dollar purchase on the ticket. Periodically the attendant forwards a batch of the credit tickets to the central office where they are processed to make up the bills which go out to the customers. The type of marking on the credit tickets of course depends on the processing methods employed in the central office. Among the various types may be mentioned printed numbers, fluorescent printing, magnetic inked characters, dot-and-dash printing, and punched holes. The punched hole type marking is considered the most advantageous since it simplifies the central office processing by eliminating scanning operations which are required with the other type markings.

Whatever type markings are employed, the methods heretofore employed for the recording of information on the credit tickets have not entirely overcome the problems of inaccuracy of recording, time consumption required in recording, and inconvenience of operation mechanism.

One object of the present invention is to provide a credit sales recording method and mechanism wherein absolute accuracy in dollar purchase value is ensured.

Another object is to provide a gasoline credit sales mechanism which is operated by and in synchronism with the gasoline pump so as to eliminate any errors in dollar purchase value recording and provide a rapid recording operation.

A further object is to provide a gasoline credit sales recorder which can be disposed within conventional gasoline pump housings, thereby eliminating the need for a separate recorder in the station office, and saving the attendant the inconvenience of journeying to and from his office to record each credit sale.

An additional object is to provide a gasoline credit sales recorder which can be operatively installed in a conventional gasoline pump housing with a minimum modification or alteration of the pump housing, thereby enabling the invention to be readily utilized in old and new pump housings with minimum labor charge or disruption of existing manufacturing procedures.

Another object is to provide a recorder which is of small compact design having minimum numbers of parts, thereby achieving manufacturing savings by effecting economies in material costs and labor costs.

A further object is to provide a recorder which can be easily and quickly put into operation by the attendant.

Other objects of this invention will appear in the following description and appended claims, reference being had to the accompanying drawings forming a part of this specification wherein like reference characters designate corresponding parts in the several views.

In the drawings:

FIG. 1 is an elevational view of a conventional gasoline pump having one embodiment of the invention incorporated therein.

FIG. 2 is a plan view of a credit ticket employed with the FIG. 1 structure, the credit card being shown in one convenient size although it being understood that the size of the card is not critical.

FIG. 3 is a sectional view taken on line 3—3 in FIG. 1.

FIG. 4 is a sectional view on line 4—4 in FIG. 1.

FIG. 5 is a plan view of a customer identity key employed with the FIG. 1 structure.

FIG. 6 is an elevational view of the FIG. 5 customer identity key.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, there is shown a conventional gasoline pump housing 10 adapted for the usual installation in a retail gasoline station. Disposed within the lower portion of housing 10 is an electric motor 12 which drives a gasoline pumping unit 14 through the belt 16. Unit 14 receives gasoline from an underground storage tank (not shown) and discharges it through a volume-pressure regulator 18 to an outlet pipe 20. Pipe 20 connects with rubber hose 22 which is equipped with the manually-actuable valve unit 24 for controlling the liquid flow through the discharge spigot 25.

The regulated flow through regulator 18 operates a shaft 26 which serves as an input shaft for the price-per gallon adjustment structure 28. Structure 28 is of conventional construction and preferably comprises a housing 30 containing a series of gears provided with manually-actuable operators for throwing the desired train of gears into connection with shaft 26 in accordance with the current price per gallon price. The arrangement is such that the rotational speed of the output shaft 32 is increased at relatively high price per gallon prices and decreased at relatively low price per gallon prices.

Output shaft 32 is suitably geared to the price indicator mechanism 33 which comprises a set of toothed devices operating the three "total price" wheels 34, 36 and 38, each numbered from zero to nine. In the illustrated embodiment wheel 34 indicates cents, wheel 36 indicates tens of cents, and wheel 38 indicates dollars. The arrangement is such that wheel 34 completes one revolution before picking up wheel 36 for one-tenth revolution. Similarly wheel 36 makes one complete revolution before picking up wheel 38 for one-tenth revolution.

The adjustment structure 28 and price indicator mechanism 33 may be of conventional construction, and the present invention is not concerned with the details of these mechanisms. Accordingly these details are not shown in the drawings.

Referring to FIG. 1, there is shown a recorder unit generally indicated by numeral 40. This unit comprises a relatively small compact housing defining a slot 42 accessible through the side wall of main housing 10 for reception of the replaceable indicia member or sales ticket 44 shown in FIG. 2. An additional slot 46 is provided in unit 40 for reception of credit keys 47 of the type shown in FIGS. 5 and 6. A lever 48 is provided for marking ticket 44 in accordance with the character of key 47 and the dollar value of the gasoline purchased.

Briefly, in use of unit 40 before or after the gas is pumped the customer's key 47 and sales ticket 44 are inserted into slots 46 and 42. After the gas is pumped lever 48 is pulled down to mark the ticket with the price and customer identity information, after which the key is returned to the customer. Periodically the attendant forwards a batch of the marked cards to the central office for billing of the customer.

The character of the sales ticket 44 is subject to considerable variation in arrangement and content, but as illustrated in FIG. 2 the sales ticket may be formed in two sections 50 and 52 separated by perforations 54. After marking the ticket it is separated along perforations 54, the station attendant retaining section 50 for forwarding to the central office and the customer retaining section 52 for his files.

As shown in FIG. 2 the ticket is pre-printed with an invoice number at 56. The date of sale may be pre-stamped as at 60 prior to insertion of the ticket into unit 40, or unit 40 may be equipped with suitable month-day-year printing elements for marking on the ticket by depression of lever 48. In the illustrated embodiment the customers identity number and dollar value of purchase are marked at 62 and 64 by depression of lever 48. Depression of lever 48 also is effective to punch the customer identity openings 66 and dollar value purchase openings 68, these openings being of particular importance in the processing of customer billings at the central office by such machines as International Business Machine's punched card equipment.

It will be seen that in the ticket shown in FIG. 2 the area designated by numeral 64 is punched out with four separate openings 68. Thus the "cents" row is punched out at the number three station, the "tens of cents" row is punched out at the number four station, and the "dollars" row is puched out at the number seven station so as to designate a purchase of seven dollars and forty-three cents. The "tens of dollars" row is punched out at the zero station.

The space on ticket 44 for formation of customer identity openings 66 is divided into a number of rows, as for example ten rows. Each row is divided into ten stations corresponding to the numbers zero through nine. In this manner the ticket may be punched with a number of different opening arrangements according to different customer identities. The card 44 shown in FIG. 2 has been punched with openings 66 to indicate a customer number of 9933694887.

The arrangement of punched openings 66 is determined by the configuration of customer identity key 47. The key shown in FIGS. 5 and 6 is provided with ten different shoulders 71 spaced different distances from an imaginary line 72 drawn across the key. The arrangement is such that as the key is inserted into slot 46 its shoulders 71 engage the ends of ten similar racks 74. Each rack has its teeth 73 in mesh with the teeth 75 of a lever 76 which is individually fulcrumed on a rod 78. Light tension springs 80 are provided for maintaining the racks 74 engaged with the key shoulders 71.

The lower end of each lever 76 is given a toothed configuration to mesh with the teeth of a rack 82, and each of these lowermost racks is provided with a marking element in the form of a punch 84. It will be seen that as customer identity key 47 is inserted into slot 46 the upper and lower racks will be shifted according to the character of shoulders 71. The punches 84 will thus register with designated ones of the openings 86 in die plate 88. As a result, when plate 88 is subsequently elevated (by depression of lever 48) the various punches 84 will form openings in ticket 44 located in accordance with the character of the customer identity key 47. Each customer is of course supplied with a differently configured key 47 (i.e. a different arrangement of shoulders 71) and accordingly each ticket 44 will have a distinguishing set of customer identity openings 66 therein for use with the automatic processing equipment at the central office.

In the illustrated embodiment the force connection between lever 48 and die plate 88 comprises two rolls 90 and 92, and two links 94 connecting the rolls at their opposite ends. The rolls are off-centerly mounted for rotation around the axes defined by pins 96. As a result, when lever 48 is moved downwardly in the arrow 98 direction the rolls will act as cams to force plate 88 upwardly and thereby cause the punches 84 to form the customer identity openings 66. FIG. 3 shows a space 97 which can accommodate a conventional printing unit for making the customer number record 62 (FIG. 2). The setting of the printing elements can of course be controlled by movement of lever 76 through suitable cables (not shown). Since the present invention is concerned primarily with mechanism for making a billing machine record the details of the printing unit at 97 have not been illustrated.

As previously indicated, unit 40 contains mechanism for making a record of the customer's dollar value purchase. This mechanism is illustrated in FIG. 4 and comprises three rotary disks 100, 102 and 104. Disk 100 is driven from the output shaft 32 (FIG. 1) through a conventional overrunning clutch (not shown) preferably disposed within unit 40. Disk 100 is provided with a pawl 106 which trips the disk 102 one tenth revolution during each revolution of disk 100. Similarly disk 102 is provided with a pawl 108 which trips disk 104 one tenth revolution during each revolution of disk 102. The arrangement is such that disk 100 is enabled to operate a "cents" recorder, disk 102 is enabled to operate a "tens of cents" recorder, and disk 104 is enabled to operate a "dollars" recorder.

The shaft for disk 100 carries a sprocket or pulley 110 which has an endless chain or belt 112 trained therearound. Endless element 112 runs over the sprockets or pulleys 114, 115 and 116. The shaft for pulley 115 operates a printing drum 118 having numbers zero through nine arranged in succession thereon. Conventional means (not shown) may be provided for supplying drum 118 with ink or similar printing material. It will be appreciated that when the gasoline pumping operation is completed drum 118 will have been rotated to a position wherein the correct cents number thereon will be in registry with ticket 44 for making the visual record at 64 (FIG. 2).

The shaft for pulley 116 carries a pulley 120 which drives an endless carrier belt 122 trained around the idler pulley 124 and running on a fixed back up plate 126. Belt 122 carries a plurality of punches 128 spaced apart by eleven times the spacing between openings 130 in die plate 88; as a result only one of the punches will register with the row of openings 130 at any one time. The size of drive pulley 120 is of course chosen so that the punches 128 have a linear velocity proportional with the peripheral velocity of drum 118. Therefore the location of punch 128 at conclusion of the gasoline pumping operation will be in accordance with the cents value of the purchase.

The shaft for disk 102 is geared to gear 103 which drives a sprocket or pulley having an endless chain or belt 134 trained therearound. Belt 134 drives a printing drum similar to drum 118 and carrier similar to carrier 122. The drum and carrier for belt 134 are located directly in line with the corresponding elements shown in FIG. 4, and the carrier carries a marking element similar to punches 128. Since disk 102 is driven only one tenth revolution per revolution of disk 100 the marking elements for belt 134 serve as tens-of-cents recorders for ticket 44.

The shaft for disk 104 carries a sprocket or pulley 136 which drives an endless chain or belt 138. Belt 138 drives marking elements arranged in the same manner as the illustrated elements 118 and 128. Since disk 104 is driven at one tenth revolution per revolution of disk 102 the marking elements of belt 138 serve as dollars recorders for ticket 44.

In use of unit 40 the flow of gasoline through hose 22 automatically operates the disks 100, 102 and 104; at conclusion of each pumping operation the marking elements 118 and 128 are automatically set in the correct positions for subsequent marking of ticket 44 by depression of lever 48. As a result there is no possibility of error in marking the dollar value of the purchase on ticket 44. Also, since the operation is automatic marker setting time is eliminated. The illustrated location of unit 40 within housing 10 is advantageous in that it permits the attendant to perform the entire credit transaction without leaving the pump, thereby saving time for himself and the customer.

After lever 48 has been depressed and ticket 44 has been withdrawn from slot 42, marking elements 128 and 118 should be returned to zero positions in order to ensure correct marking operations at conclusion of the next gasoline pumping operation. In the illustrated embodiment the zero reset operation is performed by a crank 140 (FIG. 1) carried by the input member of a conventional overrunning clutch 142. The clutch output drives a gear or sprocket 143, over which is trained an endless drive element 144. Element 144 drives the gears or sprockets 146, 148 and 150, having shafts which carry the gears 152, 154 and 156. These last mentioned gears mesh with gears 158, 160 and 162 carried on the shafts for disks 100, 102 and 104. It will be noted that each of the gears 158, 160 and 162 has one tooth thereof missing, the arrangement being such that when the blank space (missing tooth) is registered with the respective gear 152, 154 or 156 no further drive is transmitted from the full gears. The gears 158, 160 and 162 are so mounted on their shafts that when the respective blank spaces register with the superjacent gears the marking elements 128 and 118 will be in their zero positions.

In operation of the zero set mechanism, when crank 140 is turned to drive element 144 the resultant movement of gears 158, 160 and 162 is effective to move the marker elements 118 and 128 to the zero positions. Of course if any of gears 158, 160 or 162 is in a zero position at beginning of the reset operation then it will remain in such position during rotation of crank 140. During the pumping of gasoline, clutch 142 prevents any rotation of crank 140.

It will be appreciated that various different mechanical expedients may be resorted to for obtaining the desired dollar value settings, customer identity marker settings, marker actuation, and zero reset operation. Also, the character of ticket 44 can be varied in arrangement and content. In this connection it will be noted that the illustrated ticket incorporates a space 157 on the customer portion 52 for recording the cash value in visually readable characters. Such a recording operation can be performed by drums operated from the mechanism shown in FIG. 4. Other printing arrangements could also be employed.

Spaces 170 and 172 on ticket 44 may receive printing indicating the total gallons pumped. The printing mechanisms for this operation may be similar to the arrangement shown in FIG. 4. However the drive for these mechanisms is preferably taken from shaft 26 (FIG. 1) rather than from shaft 32 since the gallonage printing needs no price adjustment correction such as is supplied by structure 28.

During the foregoing description unit 40 has been described as having the special drive devices 100, 102 and 104. However, if desired the unit could be constructed to utilize the drive devices in recorder structure 33, in which case three drive connections would be made between unit 40 and structure 33. Various modifications and rearrangements could be resorted to without departing from the spirit of the invention as defined in the appended claims.

I claim:

1. The combination comprising fuel pumping means; means associated therewith for temporarily supporting a replaceable indicia member; a series of pumped fuel recording punches arranged to apply information to the indicia member while said member is located on said temporary support means; means driven in synchronism with the pumping means for adjusting the positions of the recording punches; manually-controlled means operative to move the indicia member and recording punches together for making a pumped fuel price record on the indicia member; a customer identity key; and means controlled by said key for applying customer identity apertures to the indicia member; said last mentioned means comprising a series of independently movable punches, and an operator for each of said punches engageable with a different portion of the key and deflectable thereby to adjust the setting of its respective punch.

2. The combination of claim 1 wherein the pumped fuel recording punches are each carried on an endless conveyor traversing the temporary support means, and said adjusting means comprises a plurality of drive arrangements operating to set the positions of said conveyors and the fuel recording punches carried thereby.

3. The combination of claim 1 wherein the pumped fuel recording punches comprise a cents price indicator punch, a tens-of cents price indicator punch, and a dollars price indicator punch; and said adjusting means comprises a carrier for each indicator punch arranged to traverse the supported indicia member and adjust the respective indicator punch to various positions along the indicia member surface.

4. The combination comprising a gasoline sales ticket having three rows of stations thereon representing dollars, tens of cents, and cents, respectively; a marking punch arranged to move along each row of stations; gasoline pumping means; locator means for each marking punch driven in synchronism with the pumping means so as to set the respective marking punch at the station corresponding with the quantity of gasoline pumped; a series of customer identity marking punches arranged to traverse a surface portion of the ticket; and manually controlled locator means for adjusting said last mentioned marking punches in accordance with the customer's identity.

5. In combination, a fluid dispenser, means carried by said dispenser for supporting an indicia member, a first movable marking punch operable by said dispenser and adapted to traverse said indicia support means to register with different portions of an indicia member positioned thereon, drive means between said dispenser and said first marking punch for adjusting the position of said punch in accordance with quantities of fluid dispensed, a seat carried by said dispenser to receive a customer identity key of the type having a shoulder thereon, a second movable marking punch carried by said dispenser to traverse said indicia support means to register with different portions of an indicia member positioned thereon, an operator connected to said second punch and engageable with said key shoulder upon insertion of said key into said seat and deflectable to adjust the setting of said punch, and means for moving said indicia member and said marking punches into marking relation with one another.

6. In a machine having a figure indicator, the improvement of a credit transaction recorder, comprising means receiving a credit transaction recording ticket, means receiving a customer identity key, a customer identity machine sensible mark recording member adapted to be set by application of a customer identity key to said key receiving means, a machine sensible mark figure recording member adapted to be set by operation of the figure indicator, and mean for actuating said recording members into recording relation with a credit transaction recording ticket held by said ticket receiving means to establish machine sensible customer identity and figure data thereon.

7. In a machine having an indicator mechanism, the improvement of a transaction recorder, comprising means for supporting a transaction recording ticket, customer identity key receiving means, a customer identity marking punch adapted to be set by application of a customer identity key to said key receiving means, a transaction data marking punch adapted to be set by operation of the indicator mechanism, and means for actuating said marking punches into recording relation with a credit transaction recording ticket held by said ticket receiving means to establish customer identity and transaction data thereon.

8. In a credit transaction recorder, a machine having a data indicator, means carried by said machine to receive a credit transaction recording member, customer identity key receiving means carried by said machine, a customer identity recording punch carried by said machine to be set by application of a customer identity key to said key receiving means, a data recording punch carried by said machine to be set by operation of said indicator, and means for actuating said recording punches into recording relation to a credit transaction recording member held by said member receiving means to establish customer identity and machine data thereon.

9. In a fluid dispenser having a pump, the improvement of a credit transaction recorder, comprising a credit transaction ticket support carried by said dispenser, a customer identity key support carried by said dispenser, a customer identity marking punch carried by said dispenser and adjustable to a marking position relative to a credit transaction ticket positioned on said ticket support by placement of a customer identity key into said key support, a transaction data marking punch carried by said dispenser and adjustable to a marking position relative to a credit transaction ticket positioned on said ticket support by operation of the pump, and means for actuating said marking punches in marking relation to a credit transaction ticket positioned on said ticket support.

10. In a combination credit transaction recorder and fluid dispenser, a frame, a fluid delivery pump carried by said frame, a credit ticket support on said frame, a customer identity key support on said frame, a customer identity marking punch element carried by said frame and adjustable to a marking position relative to a credit ticket positioned on said ticket support by placement of a customer identity key into said key support, a transaction data marking punch element carried by said frame and adjustable to a marking position relative to a credit ticket positioned on said ticket support by operation of said pump, and means for actuating said marking punch elements in marking relation to a credit ticket positioned on said ticket support.

11. In a credit transaction recording system, a fluid merchandise dispenser, a credit ticket support, a credit identity key support, a credit identity marking punch adjustable to a marking position relative to a credit ticket positioned on said ticket support by placement of a customer identity key into said key support, a transaction data marking punch adjustable to a marking position relative to a credit ticket positioned on said ticket support by operation of said merchandise dispenser, and means for actuating said marking punches in marking relation to a credit ticket positioned on said ticket support.

12. In a credit transaction recording system, a fluid merchandise dispenser, a transaction record member support, a transaction record member positionable on said transaction record member support, a customer identity member support, a customer identity member positionable in said customer identity member support, a customer identity machine sensible marking element adjustable to a marking position relative to said transaction record member by said customer identity member, a transaction data machine sensible marking element adjustable to a marking position by operation of said merchandise dispenser, and means for actuating said marking elements in marking relation to said transaction record member.

13. In a business transaction recording system, a machine having a transaction figure indicator, a transaction record member support, a record member positionable on said record member support, a customer identity key support, a customer identity key positionable in said key support, a customer identity machine sensible marking element adjustable to a marking position relative to said record member by said key, a transaction data machine sensible marking element adjustable to marking position relative to said record member by operation of said indicator, and means for actuating said machine sensible marking elements in marking relation against said record member.

References Cited in the file of this patent

UNITED STATES PATENTS

| | | | |
|---|---|---|---|
| 1,731,744 | Hartley | Oct. 15, | 1929 |
| 2,338,180 | Harrison | Jan. 4, | 1944 |
| 2,545,460 | Hall | Mar. 20, | 1951 |
| 2,554,296 | Crews | May 22, | 1951 |
| 2,612,428 | Vroom | Sept. 30, | 1952 |
| 2,792,148 | Goldenberg | May 14, | 1957 |
| 2,977,024 | Harris | Mar. 28, | 1961 |